(12) United States Patent
Bauer et al.

(10) Patent No.: US 10,256,983 B1
(45) Date of Patent: Apr. 9, 2019

(54) CIRCUIT THAT INCLUDES A PHYSICALLY UNCLONABLE FUNCTION

(71) Applicant: National Technology & Engineering Solutions of Sandia, LLC, Albuquerque, NM (US)

(72) Inventors: Todd Bauer, Albuquerque, NM (US); Jason Hamlet, Albuquerque, NM (US); Ryan Michael Birmingham, Albuquerque, NM (US); Lyndon G. Pierson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 300 days.

(21) Appl. No.: 15/077,488

(22) Filed: Mar. 22, 2016

Related U.S. Application Data (60) Provisional application No. 62/138,243, filed on Mar. 25, 2015.

(51) Int. Cl.
*H04L 9/00* (2006.01)
*H04L 9/32* (2006.01)
*H04L 9/08* (2006.01)

(52) U.S. Cl.
CPC .......... *H04L 9/3278* (2013.01); *H04L 9/0861* (2013.01)

(58) Field of Classification Search
CPC ............................. H04L 9/3278; H04L 9/0861
See application file for complete search history.

(56) References Cited

U.S. PATENT DOCUMENTS

| | | |
|---|---|---|
| 8,274,306 B1 | 9/2012 | Garcia |
| 8,290,150 B2 | 10/2012 | Erhart et al. |
| 8,516,269 B1 | 8/2013 | Hamlet et al. |
| 8,848,905 B1 | 9/2014 | Hamlet et al. |
| 9,202,554 B2 | 12/2015 | Chu et al. |
| 2007/0038871 A1 | 2/2007 | Kahlman et al. |
| 2013/0142329 A1* | 6/2013 | Bell ............... H04L 9/0866 380/44 |

(Continued)

OTHER PUBLICATIONS

Bolotnyy, et al., "Physically Unclonable Function-Based Security and Privacy in RFID Systems", In Proceedings of the Fifth Annual IEEE International Conference on IEEE, 2007, PerCom'07, 8 pages.

*Primary Examiner* — Baotran N To
(74) *Attorney, Agent, or Firm* — Medley, Behrens & Lewis, LLC (57) ABSTRACT

Described herein are various technologies pertaining to authentication of integrated circuits by using external factors to affect or modify an output of a physically unclonable function (PUF) circuit. In an example, the output of the PUF circuit in response to a challenge signal can be sensitive to changes in environmental factors. In another example, the output of the PUF circuit can be sensitive to user-selectable configuration parameters of the PUF circuit. In yet another example, the output of the PUF circuit can be modified by additional circuitry external to the PUF circuit based upon one or more selectable or configurable inputs. A PUF-based device authentication system that uses external factors as authentication inputs to affect a challenge response of the device authentication system can enhance authentication capabilities by permitting multi-factor authentication.

19 Claims, 6 Drawing Sheets

(56) References Cited

U.S. PATENT DOCUMENTS

| | | | |
|---|---|---|---|
| 2014/0201851 A1* | 7/2014 | Guo | H04L 9/0866 |
| | | | 726/34 |
| 2015/0058928 A1 | 2/2015 | Guo et al. | |
| 2015/0269378 A1* | 9/2015 | Falk | H04L 9/3278 |
| | | | 726/6 |
| 2015/0278505 A1* | 10/2015 | Lu | H04L 9/0866 |
| | | | 726/19 |

\* cited by examiner

CIRCUIT THAT INCLUDES A PHYSICALLY UNCLONABLE FUNCTION

RELATED APPLICATION

This application claims priority to U.S. Provisional Patent Application No. 62/138,243 filed on Mar. 25, 2015, and entitled "IMPACTING PUF GENERATION WITH EXTERNAL FACTORS", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Authentication of integrated circuits (ICs) throughout a supply chain is a crucial component of ensuring the security and reliability of high-consequence electronic systems, and can reduce the risk of subversion of such systems by substitution of specified components with inferior or insecure components. Physically unclonable functions (PUFs) have been used for the purpose of IC authentication. A PUF device has an output characteristic that is inherent to its physical structure and that can be readily measured, but that is also practically impossible to predict or duplicate. Thus, a PUF should consistently produce a same output given a same input, but it should be difficult to predict an expected output for any given input prior to actual measurement. By including a PUF on a high-consequence IC, a user can verify the integrity of the IC by challenging the PUF with an input having a known, previously-measured output, and comparing the PUF's response to the known output. Since the PUF's output characteristic is generally unpredictable prior to measurement, if a subverting party does not know in advance the challenge to be used and the expected response, it will be practically impossible for the attacker to substitute the IC without being detected.

SUMMARY

The following is a brief summary of subject matter that is described in greater detail herein. This summary is not intended to be limiting as to the scope of the claims.

Described herein are various technologies pertaining to authentication of ICs using external factors to affect PUF circuit outputs. An output of a PUF circuit can be modulated using external factors such as, for example, environmental conditions under which a challenge to the PUF circuit is to be issued, user inputs to encryption circuitry coupled to the PUF circuit, etc. In an example, a user can select a value for an intrinsic authentication input condition that affects the PUF circuit's output characteristic. The PUF circuit has a previously-measured, expected response to a challenge under the value of the intrinsic authentication input condition. In another example, a user can issue the challenge to the PUF circuit and can select a value for an extrinsic authentication input condition, wherein the extrinsic authentication input condition is combined with the PUF circuit's response to the challenge via an output transform circuit. In yet another example, a user can affect the PUF circuit's output characteristic by selecting both a value for the intrinsic authentication input condition and a value for the extrinsic authentication input condition. The user can then issue the challenge signal to the PUF circuit, whereupon the PUF circuit outputs a response based upon the challenge signal and the intrinsic authentication input condition. The output transform circuit can then receive the response output from the PUF circuit and output a new response based upon the response output from the PUF circuit and the extrinsic authentication input condition. Thus, through modification of the challenge signal, the intrinsic authentication input condition, or the extrinsic authentication input condition, the user can affect a final challenge response signal output by an authentication system comprising the PUF circuit.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to integrated circuit (IC) authentication using external factors to affect outputs of physically unclonable functions (PUFs) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
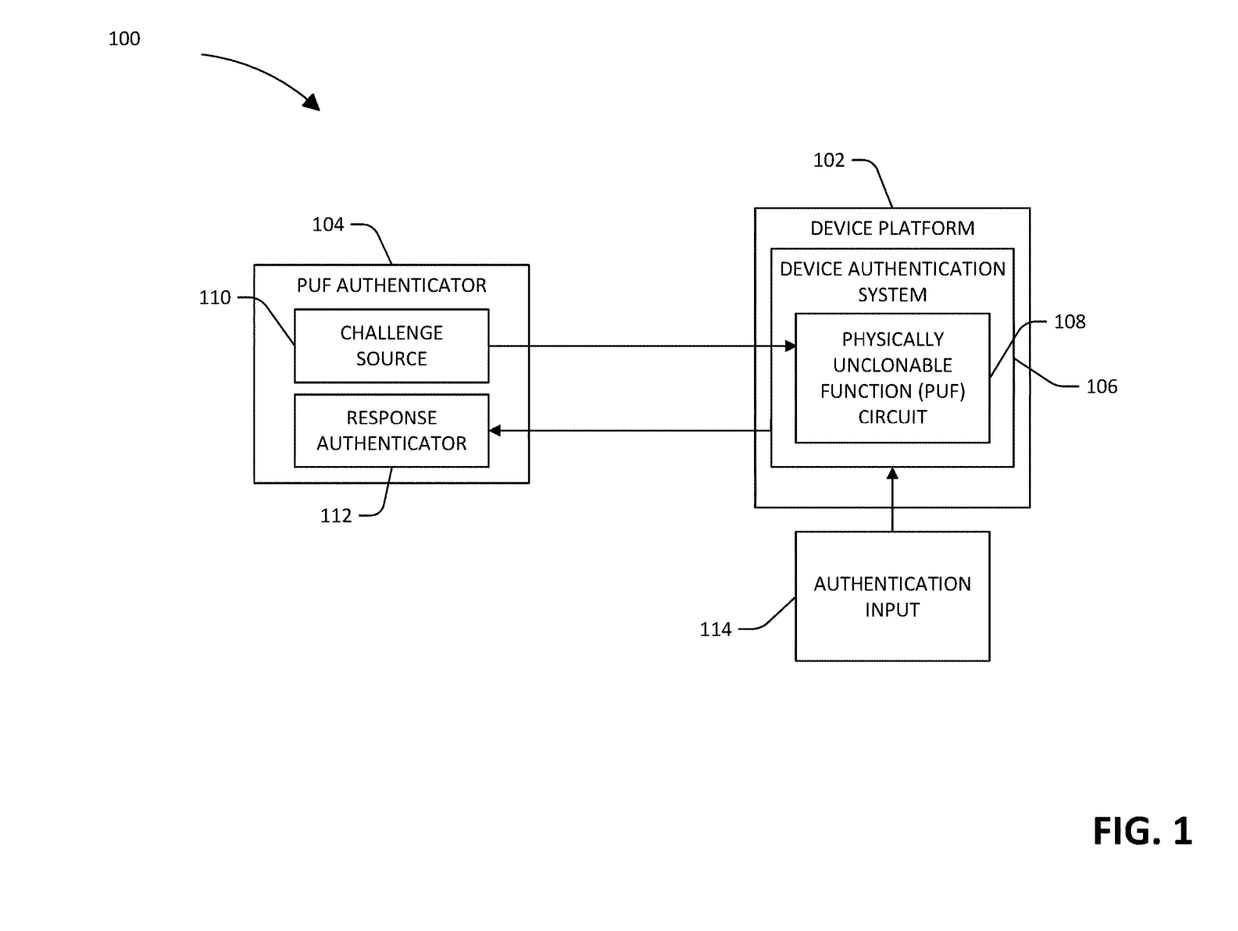
FIG. 1 is a functional block diagram of an exemplary system that facilitates authentication of ICs via PUF-based authentication using external factors.

With reference to FIG. 1, an exemplary system 100 that facilitates PUF-based authentication using external factors to influence an output of a PUF circuit is illustrated. The system 100 includes a device platform 102 comprising a PUF authenticator 104 and a device authentication system 106, the device authentication system 106 comprising a PUF circuit 108. The PUF authenticator 104 comprises a challenge source 110 and a response authenticator 112. The PUF authenticator 104 communicates with the device authentication system 106 in order to authenticate the integrity of the device platform 102. The device platform 102 can be substantially any device, circuit, or thing that is desirably authenticated by the PUF authenticator 104 and the device authentication system 106. In an example, the device platform 102 can be an IC installed in a high-consequence electronic system for military applications, and the PUF authenticator 104 can communicate with the device authentication system 106 to verify that the IC has not been subverted by substitution with other components.

It is to be understood that FIG. 1 depicts an abstraction of various exemplary embodiments of the invention of the present disclosure. The abstraction presented in FIG. 1 is intended to highlight certain features of the invention applicable across a range of embodiments having differing structural characteristics. In a first example, the PUF authenticator 104, the device authentication system 106, the PUF circuit 108, the challenge source 110, and the response authenticator 112 can be circuits implemented on one or more application-specific integrated circuits (ASICs). In another example, these components can comprise configurable blocks of one or more field-programmable gate arrays (FPGAs). In still another example, some of these components can be computer-executable instructions loaded into memory and executed by a processor.

The PUF authenticator 104 communicates with the device authentication system 106. The challenge source 110 issues a challenge signal to the PUF circuit 108 whereupon the device authentication system 106 outputs a challenge response signal to the response authenticator 112. The response authenticator 112, responsive to receiving the challenge response, determines whether or not the device platform 102 is authorized by comparing the received challenge response with an expected value of the challenge response. If the received value matches the expected value, the response authenticator 112 can output an indication that the device platform 102 is authenticated, or if the received value does not match the expected value the response authenticator 112 can output an indication that the device platform 102 is not authenticated.

The challenge response output by the device authentication system 106 is based upon an output characteristic of the PUF circuit 108, and thus the challenge received from the challenge source 110. As described above, a PUF circuit has an output that is difficult to predict for a given input unless the output has been measured in advance for that input. PUF circuits can be constructed in a variety of configurations, but commonly take advantage of unpredictable component or material characteristic variations that are unavoidably introduced in their manufacture. In an exemplary application, a PUF can be used to detect substitution of electronic components. In order to later verify the device platform's 102 authentication status via interrogation of the device authentication system 106, a challenge signal that is desirably used can be initially provided to the PUF circuit 108 and the challenge response from the device authentication system 106 measured. The challenge signal can then be used at a later time to interrogate the device authentication system 106. The device authentication system 106 should return the previously-measured challenge response if the device platform 102 and the device authentication system 106 are the same components interrogated for the previous measurement.

In another example, the challenge response from the device authentication system 106 can be used as a key in a cryptographic authentication scheme. In an enrollment stage, the output of the PUF circuit 108 can be used by the device authentication system 106 as a seed value to generate a public-private cryptographic key pair. The public key is output to, for example, a manufacturer of the device platform 102 or a trusted certification authority so that it can be referenced for use in a later deployment stage of the device platform. The private key is not retained by the device authentication system 106. In the deployment stage, for example during an end-use application of the device platform 102, the public key from the public-private key pair can be used by a challenger to encrypt the challenge signal, whereupon the challenge signal is provided to the device authentication system 106. The device authentication system 106, responsive to receiving the encrypted challenge signal, interrogates the PUF circuit 108 to provide the seed to regenerate the public-private key pair. The device authentication system 106 then uses the regenerated private key to decrypt the encrypted challenge signal. The device authentication system 106 then transmits the decrypted challenge signal back to the challenger. Only the PUF circuit 108 that seeded the key pair from which the public key was drawn in the enrollment stage should be able to provide the correct seed to generate the paired private key needed to decrypt the encrypted challenge signal. Thus, when the challenger receives the properly-decrypted challenge signal from the device authentication system 106, the challenger can be sure that the device platform 102 is the same device platform that was enrolled in the enrollment stage.

The device authentication system 106, in addition to receiving the challenge from the challenge source 110, can receive or be subject to an authentication input 114. The authentication input 114 can be substantially any external factor that can be used to modulate the challenge response of the device authentication system 106 (e.g., a signal, environmental condition, a configuration state of circuitry, etc.). The challenge response output by the device authentication system 106 is based upon the challenge issued by the challenge source 108 and the authentication input 114. It is to be understood that the device authentication system 106 is an abstraction of any of a variety of different configurations of components that include the PUF circuit 108 and that operating together provide the challenge response to the response authenticator 112.

By using both the challenge from the challenge source 110 and the authentication input 114 to generate the challenge response, the system 100 can provide additional security benefits over existing PUF-based authentication systems. For example, a user-selected authentication input 114 can be used alongside a challenge signal to provide multifactor authentication. Further, the system 100 can accommodate re-enrollment in an authentication scheme by allowing a user to change the challenge response through modification of the authentication input 114. The system 100 can also permit independent, secure authentication among many users by allowing the users to each independently modify the authentication input 114, resulting in a challenge response that is unique for each user. Thereby, each user can independently verify a device's authentication status with his or her own trusted authentication conditions. The system 100 also allows a broader range of input conditions to be used for authentication, as described in greater detail below.

It is to be understood that while some components are depicted as being components of a same device or integrated circuit, the invention described herein is not limited to such exemplary embodiments. For example, the PUF authenticator 104 and the device authentication system 106 can be components of the same device platform 102. Likewise, the challenge source and response authenticator need not be components of a same PUF authenticator 104, and may instead be components of separate devices from one another.

Figure 2:
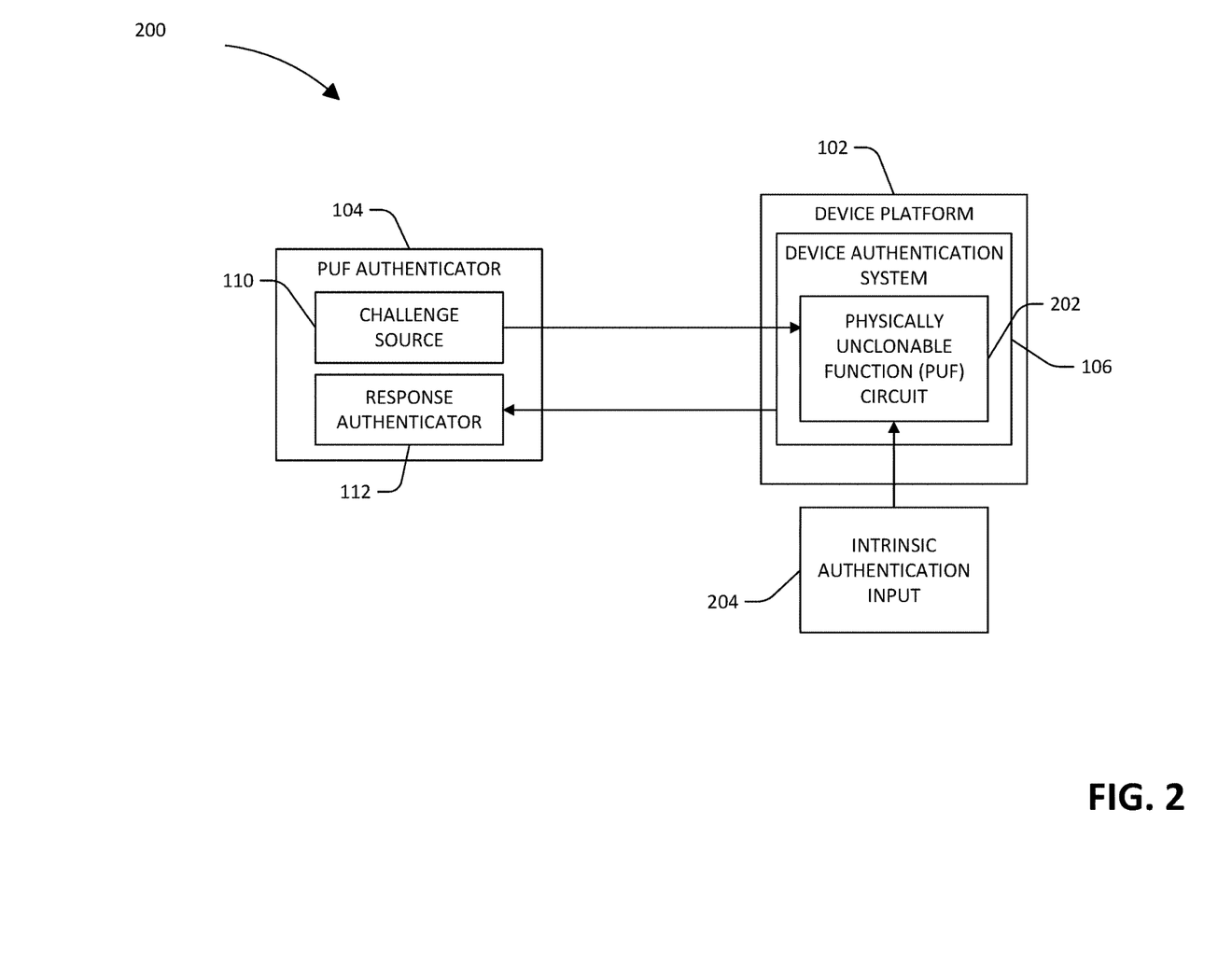
FIG. 2 is a functional block diagram of an exemplary system that facilitates authentication of ICs via PUF-based authentication using external factors to intrinsically affect the PUF's output.

Referring now to FIG. 2, an exemplary system 200 that facilitates PUF-based authentication through intrinsic modification of a PUF circuit's output characteristic is illustrated. The system 200 includes the PUF authenticator 104 and the device platform 102. The PUF authenticator 104 comprises the challenge source 110 and the response authenticator 112. The device platform 102 comprises the device authentication system 106 which in the exemplary system 200 comprises a PUF circuit 202. The PUF circuit 202 is a PUF circuit the output of which can additionally be affected by an input factor other than the challenge signal. The challenge source 110 issues the challenge signal to the PUF circuit 202 whereupon the device authentication system 106 provides the challenge response to the response authenticator 112.

In the system 200, the authentication input is an intrinsic authentication input 204 that is provided to the PUF circuit 202. The intrinsic authentication input 204 changes the output of the PUF circuit 202 itself, which is referred to herein as intrinsic modification of the PUF output. This stands in contrast to extrinsic modification, in which an output of a PUF circuit is modified after it is generated by the PUF circuit, as described in greater detail below with respect to FIG. 3. The intrinsic authentication input 204 can be substantially any factor other than the challenge signal that influences the output of the PUF circuit 202 itself. For example, the PUF circuit 202 can be a circuit that is sensitive to changes in temperature, and the intrinsic authentication input 204 can be a reference temperature at which the PUF circuit 202 is interrogated. Thus, the challenge response provided by the device authentication system 106, which is based upon an output of the PUF circuit 202, can be varied for a single challenge signal value by varying the intrinsic authentication input (e.g., temperature) 204. In another example, the PUF circuit 202 can be a circuit having an output that is sensitive to changes in a supply voltage, and the intrinsic authentication input 204 can be a selection of a value of the supply voltage.

It is apparent from the foregoing examples that the intrinsic authentication input 204 as depicted in FIG. 2 is presented as an abstraction and is not intended to be limited to, for example, signals provided directly to the PUF circuit 202. Generally, the intrinsic authentication input 204 in the exemplary intrinsic PUF output modification system 200 is any input to the system, other than the challenge signal itself, that affects the output of the PUF circuit 202 when challenged. In yet another example, the output of the PUF circuit 202 can be sensitive to changes in a magnetic field and the intrinsic authentication input 204 can be a magnetic field characteristic. A user can modify the magnetic field so that the magnetic field characteristic has a reference value when the challenge source 110 issues the challenge to the PUF circuit 202. In still yet another example, the PUF circuit 202 can comprise a plurality of comparison circuits, and the intrinsic authentication input 204 can comprise a selection of an order of operation of the comparison circuits, such that comparisons occur in the selected order. By way of another example, the PUF circuit 202 can be a delay-based PUF circuit, the output of which is based upon propagation delays of signals through the internal circuitry of the PUF 202. In such example the authentication input can be a selection of a signal path by which the challenge signal propagates through the internal circuitry of the PUF 202. While the foregoing present certain examples of the intrinsic authentication input 204 and a configuration of the PUF circuit 202, it is to be understood that the invention is not limited to these examples.

Figure 3:
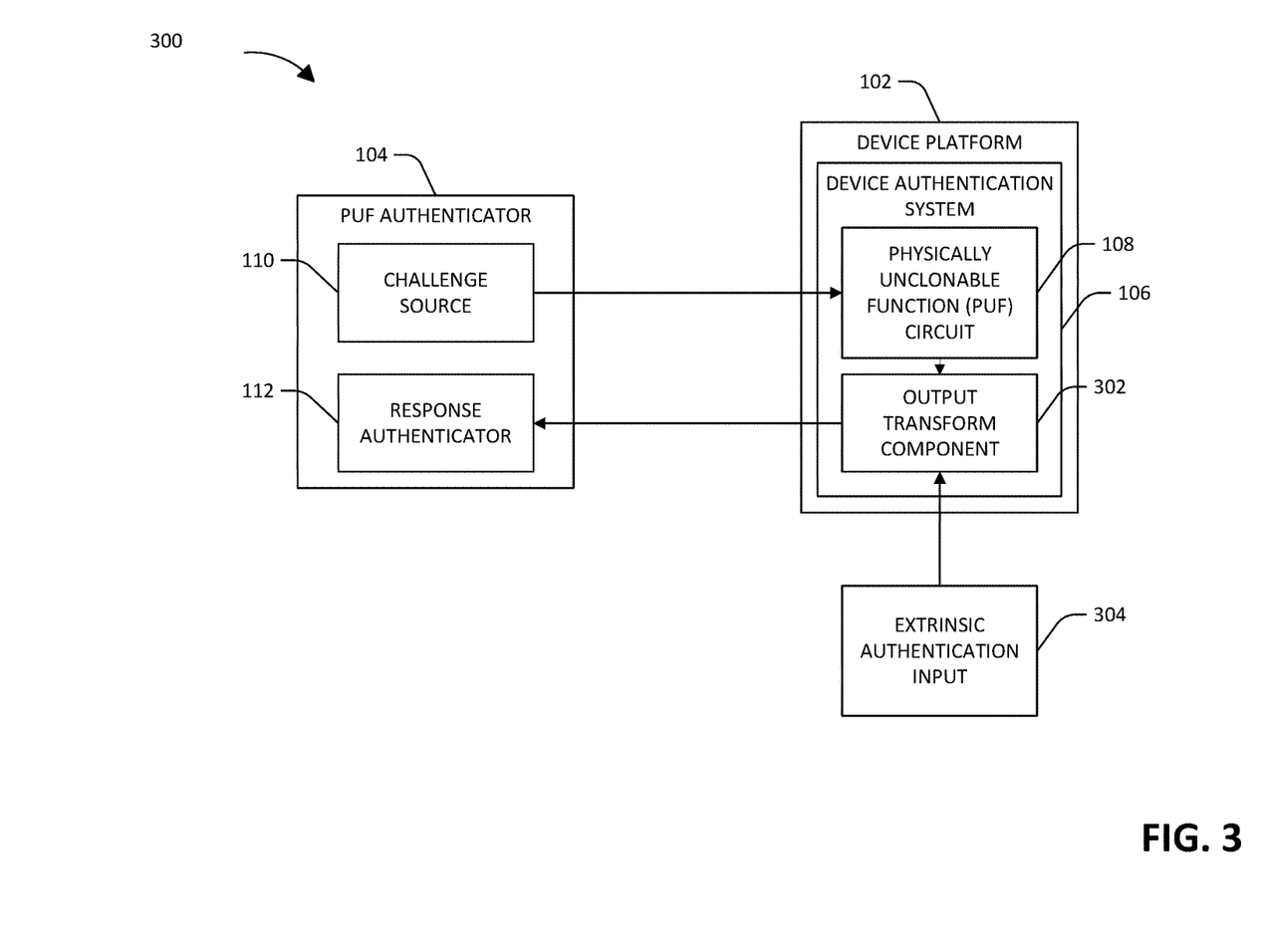
FIG. 3 is a functional block diagram of an exemplary system that facilitates authentication of ICs via PUF-based authentication using external factors to extrinsically modify the PUF's output.

Referring now to FIG. 3, an exemplary system 300 that facilitates PUF-based authentication through incorporation of extrinsic modification of a PUF circuit's output is illustrated. The system 300 comprises the device platform 102 to be authenticated and the PUF authenticator 104, comprising the challenge source 110 and the response authenticator 112. The device platform 102 comprises the device authentication system 106, the device authentication system 106 comprising the PUF circuit 108 and an output transform component 302.

The output transform component 302 receives an output of the PUF circuit 108 generated in response to the PUF circuit 108 receiving the challenge from the challenge source 110. The output transform component 302 also receives an extrinsic authentication input 304 and modifies the output received from the PUF circuit 108 to generate a challenge response that is provided to the response authenticator 112. The output transform component 302, therefore, provides extrinsic modification of the PUF circuit's 108 output after it has already been generated by the PUF circuit 108, rather than intrinsic modification of the output as described above with respect to FIG. 2. The extrinsic authentication input 304 can be essentially any signal, condition, data, or configuration that can be used by the output transform component 302 to modify an output received from the PUF circuit 108. The output transform component 302 can comprise substantially any device, components, or circuitry that can modify the output of the PUF circuit 108 based upon the extrinsic authentication input 304, or that can generate the challenge response based upon the output of the PUF circuit 108 and the extrinsic authentication input 304. Thus, the output transform component 302 can provide a means to enhance authentication capabilities of existing PUF circuit designs by allowing factors other than the challenge issued to the PUF circuit 108 by the challenge source 110 to affect the output of the device authentication system 106.

The output transform component 302 can be configured in many different ways consistent with the principles of the invention. In an example, the output transform component 302 can be a deterministic random number generator (DRNG), and the DRNG can receive the output of the PUF circuit 108 as a bit stream that can be used as a seed for the DRNG. The DRNG can then output a number to the response authenticator 112 pseudo-randomly based upon the seed. The DRNG thus serves as a hash function to compress entropy of the PUF circuit 108 output or spread the PUF circuit's entropy over a larger number of bits. The extrinsic authentication input 304 can comprise a user selection of configuration parameters of the DRNG, such as a number of bits to be output by the DRNG. In another example, the output transform component 302 can be an error correction component that implements error correction coding on the output received from the PUF circuit 108, and the extrinsic authentication input 304 can be a selection of a number of applications of an error correction code or a type of error correction coding to apply. In still another example, the output transform component 302 can be a block cipher, and the authentication input can comprise a bit stream that can serve as either a plaintext to be encrypted using the PUF circuit output as a key, or as a key with which to encrypt the output of the PUF circuit 108. The challenge response provided by the block cipher comprises the ciphertext generated as a result of the encryption. In still yet another example, the output transform component 302 can be a component that performs simulated annealing on the output of the PUF circuit 108 in order to generate the challenge response. The authentication input can comprise a parameter of the simulated annealing such as, for example, a randomness test to be applied, an order of a plurality of randomness tests to be applied, a number of annealing iterations to apply, etc.

Figure 4:
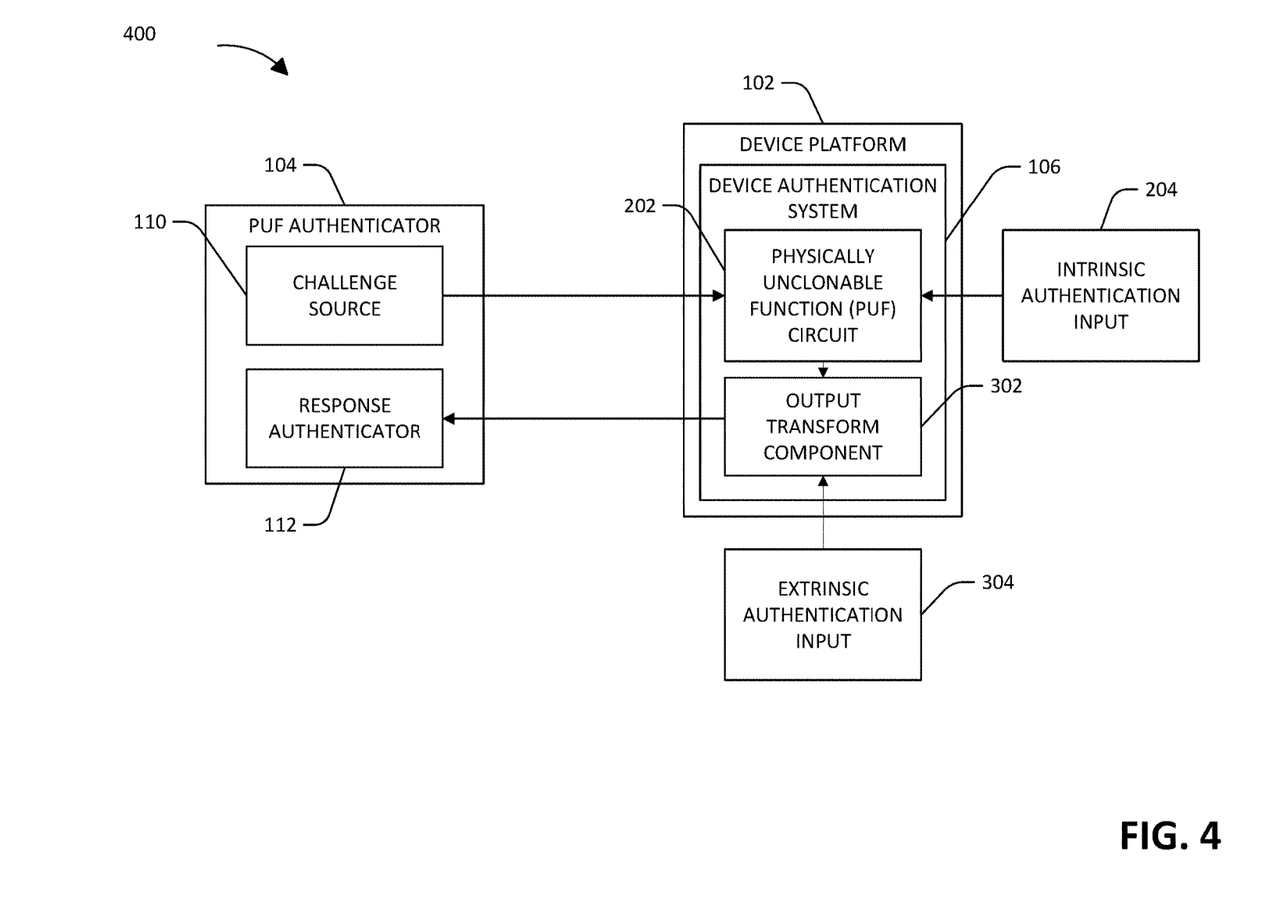
FIG. 4 is a functional block diagram of an exemplary system that facilitates authentication of ICs via PUF-based authentication using both external factors to intrinsically affect the PUF's output and other external factors used to extrinsically modify the PUF's output.

Referring now to FIG. 4, an exemplary system 400 is illustrated that incorporates the use of both intrinsic and extrinsic PUF circuit output modification techniques, as described above with respect to FIGS. 2 and 3, respectively. The challenge source 110 can issue a challenge to the PUF circuit 202. The PUF circuit 202 receives the challenge and the intrinsic authentication input 204, and generates an output that is based upon the challenge and the intrinsic authentication input 204. Thus, as described above with respect to FIG. 2, the intrinsic authentication input 204 impacts the output of the PUF circuit 202 itself. The output transform component 302 receives the output of the PUF circuit 202 and also receives the extrinsic authentication input 304. The extrinsic authentication input 304, as described above with respect to FIG. 3, can be used by the output transform component 302 to modify the output of the PUF circuit 202 after it has been generated by the PUF circuit 202. Hence, the output transform component 302 provides a challenge response to the response authenticator 112 that is based upon the output of the PUF circuit 202 and the extrinsic authentication input 304.

While certain exemplary embodiments have been described herein, it is to be understood that other configurations of the PUF-based authentication system are contemplated as being within the scope of the present invention. For example, a device authentication system can comprise a plurality of PUF circuits and an output transform component. In the example, the output transform component can be a multiplexer that selects an output of one of the plurality of PUF circuits based upon receiving an authentication input signal. In another example, a device authentication system can comprise two or more PUF circuits connected in series, wherein the output of a first PUF circuit can be used as a challenge signal for a second PUF circuit, wherein further either or both of the outputs of the first or second PUF circuits can be based in part upon an authentication input. Furthermore, it is to be understood that authentication inputs 114, 204, and 304 can be provided by a variety of different devices, components, or actions, depending on the nature of an authentication input in question. For example, where the authentication input 114 is a temperature, the authentication input 114 can be provided by a heater, or a refrigeration device. In general, a device, component, action, etc. that provides an authentication input can be described as a stimulation source that provides a stimulus (i.e., an authentication input condition) upon which a challenge response of a PUF-based authentication system is based.

Figure 5:
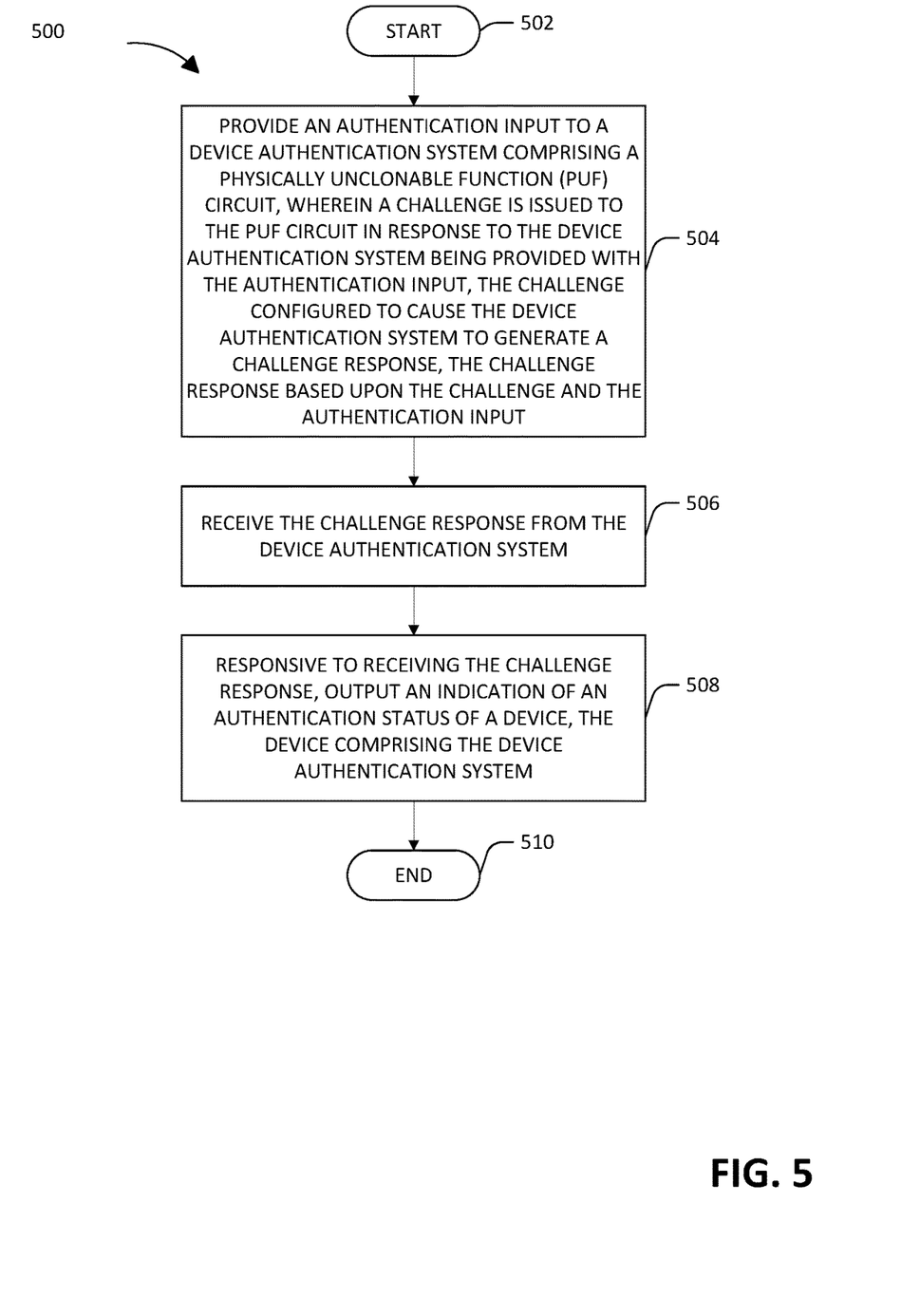
FIG. 5 is a flow diagram that illustrates an exemplary methodology for authentication of ICs via PUF-based authentication using external factors.

FIG. 5 illustrates an exemplary methodology relating to PUF-based authentication incorporating authentication using external factors. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, some of the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that facilitates PUF-based authentication is illustrated. The methodology 500 begins at 502, and at 504 an authentication input is provided to a device authentication system that comprises a PUF circuit. The authentication input can be any of the external factors described above with respect to FIGS. 2 and 3, whether intrinsic or extrinsic. At 504 a challenge is issued to the PUF circuit in response to the device authentication system being provided with the authentication input, where the challenge is configured to cause the device authentication system to generate a challenge response that is based upon the issued challenge and the provided authentication input. The challenge can be, for example, a bit stream or other signal. Likewise the challenge response can be a signal, digital or otherwise, that is interpretable or otherwise usable in the operation of a circuit or device. At 506 the challenge response generated by the device authentication system is received. At 508 an indication of an authentication status of a device that comprises the device authentication system is output, based upon the challenge response received from the device authentication system, whereupon the methodology 500 ends 510.

Figure 6:
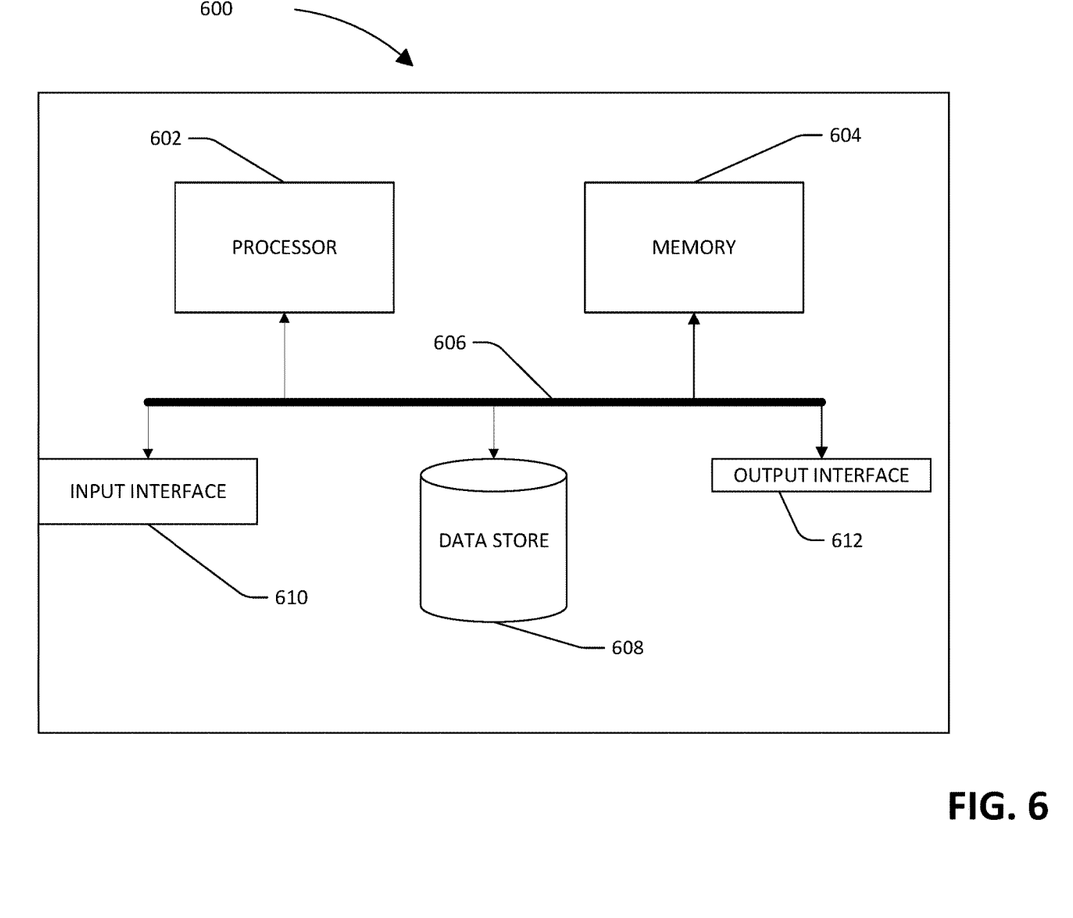
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that provides authentication inputs to a PUF-based authentication system. By way of another example, the computing device 600 can be used in a system that interfaces with a PUF-based authentication system to confirm an authentication status of an IC. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store data with respect to an authentication status of a device, expected challenge-response pairs, etc.

The computing device 600 additionally includes a data store 608 that is accessible by the processor 602 by way of the system bus 606. The data store 608 may include executable instructions, PUF challenge-response pairs, historical authentication results data, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    a physically unclonable function (PUF) circuit;
    a challenge source that provides a challenge signal to the PUF circuit, wherein the challenge signal is configured to cause the PUF circuit to output a challenge response, the challenge response based upon the challenge signal and an authentication input condition provided by a stimulation source; and
    a response authenticator configured to output an indication of an authentication status of a device based upon the challenge response, the device comprising the PUF circuit.

2. The system of claim 1, further comprising an output transform component, the output transform component configured to receive the challenge response from the PUF circuit, wherein the output transform component outputs a response signal based upon the challenge response output by the PUF circuit and a second authentication input condition, wherein the response authenticator outputs the indication of the authentication status of the device based upon the response signal output by the output transform component.

3. The system of claim 2, wherein the output transform component outputs the response signal based upon applying an error correction code to the challenge signal output by the PUF circuit, wherein further the second authentication input condition is an amount of error correction to be applied by the output transform component.

4. The system of claim 2, wherein the output transform component comprises a block cipher, wherein the block cipher generates a ciphertext based upon the challenge response output by the PUF circuit and the second authentication input condition, wherein the response authenticator outputs the indication of the authentication status of the device based upon the ciphertext.

5. The system of claim 4, wherein the block cipher generates the ciphertext by encrypting the challenge response using the second authentication input condition as an encryption key.

6. The system of claim 4, wherein the block cipher generates the ciphertext by encrypting the second authentication input condition using challenge response as an encryption key.

7. The system of claim 2, wherein the output transform component comprises a deterministic random number generator (DRNG), the DRNG uses the challenge response output by the PUF circuit as a seed to generate a pseudorandom number, wherein further the response authenticator outputs the indication of the authentication status of the device based upon the pseudorandom number.

8. The system of claim 2, wherein the output transform component performs simulated annealing on the challenge response output by the PUF circuit to generate the response signal, wherein further the second authentication input comprises a parameter of the simulated annealing.

9. The system of claim 2, wherein the challenge response output by the PUF circuit is further based upon a third authentication input condition.

10. The system of claim 1, wherein the device further comprises:
the stimulation source;
the challenge source; and
the response authenticator.

11. A method, comprising:
providing an authentication input to a device authentication system that comprises a physically unclonable function (PUF) circuit, wherein a challenge is issued to the PUF circuit in response to the device authentication system being provided with the authentication input, the challenge configured to cause the PUF circuit to generate a challenge response, the challenge response based upon the challenge and the authentication input;
receiving the challenge response from the PUF circuit; and
responsive to receiving the challenge response, outputting an indication of an authentication status of a device, the device comprising the device authentication system.

12. The method of claim 11, wherein providing the authentication input to the device authentication system comprises providing the authentication input to the PUF circuit.

13. The method of claim 12, wherein providing the authentication input to the PUF circuit comprises modifying a temperature of the PUF circuit so that when the challenge is issued to the PUF circuit the temperature of the PUF circuit is a first reference temperature.

14. The method of claim 12, wherein providing the authentication input to the PUF circuit comprises modifying a signal delay of the challenge issued to the PUF circuit.

15. The method of claim 12, wherein providing the authentication input to the PUF circuit comprises selecting a supply voltage for the PUF circuit, wherein the supply voltage is a voltage supplied to the PUF circuit when the challenge is issued to the PUF circuit.

16. The method of claim 12, wherein providing the authentication input to the PUF circuit comprises modifying a characteristic of a magnetic field of the PUF circuit to be a reference characteristic value when the challenge is issued to the PUF circuit.

17. The method of claim 11, wherein providing the authentication input to the device authentication system comprises selecting an order of operation of two or more comparison circuits, the PUF circuit comprising the comparison circuits, wherein responsive to the challenge being issued to the PUF circuit, the comparison circuits perform a function in the selected order of operation.

18. The method of claim 11, wherein the authentication input is a first authentication input, the method further comprising: providing a second authentication input to the PUF circuit, wherein the output of the PUF circuit is based upon the first authentication input, the second authentication input and the challenge.

19. A system comprising:
an integrated circuit (IC) comprising:
a physically unclonable function (PUF) circuit;
a PUF interrogator device configured to provide a challenge signal to the PUF circuit, wherein responsive to receiving the challenge signal the PUF circuit generates an output, the output of the PUF circuit based upon the challenge signal and a first authentication input condition;
an output transform component that receives the output of the PUF circuit and generates a challenge response signal based upon the output of the PUF circuit and a second authentication input condition; and
a response authenticator component that, responsive to receiving the challenge response signal, outputs an indication of an authentication status of the IC.

* * * * *